(12) United States Patent
Sekine et al.

(10) Patent No.: US 10,507,607 B2
(45) Date of Patent: Dec. 17, 2019

(54) HONEYCOMB CORE, HONEYCOMB SANDWICH STRUCTURE, AND HONEYCOMB CORE MANUFACTURING METHOD

(71) Applicant: MITSUBISHI ELECTRIC CORPORATION, Chiyoda-ku (JP)

(72) Inventors: Kazushi Sekine, Chiyoda-ku (JP); Masahiro Miyashita, Chiyoda-ku (JP); Hiroki Kobayashi, Chiyoda-ku (JP); Masami Kume, Chiyoda-ku (JP); Saburo Murase, Chiyoda-ku (JP); Shigeru Ariki, Chiyoda-ku (JP); Kozo Hayata, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 76 days.

(21) Appl. No.: 15/568,517

(22) PCT Filed: Feb. 18, 2016

(86) PCT No.: PCT/JP2016/054711
§ 371 (c)(1),
(2) Date: Oct. 23, 2017

(87) PCT Pub. No.: WO2016/185743
PCT Pub. Date: Nov. 24, 2016

(65) Prior Publication Data
US 2018/0117802 A1   May 3, 2018

(30) Foreign Application Priority Data

May 21, 2015 (JP) ................. 2015-103497

(51) Int. Cl.
  *B32B 3/12* (2006.01)
  *B29C 43/32* (2006.01)
  (Continued)

(52) U.S. Cl.
  CPC .............. *B29C 43/32* (2013.01); *B29C 70/10* (2013.01); *B32B 3/12* (2013.01); *B32B 5/02* (2013.01); *B64G 1/66* (2013.01); *G02B 7/183* (2013.01)

(58) Field of Classification Search
  CPC .... B32B 3/12; B32B 5/02; B32B 5/12; B29D 24/005; B29D 99/0089
  (Continued)

(56) References Cited

U.S. PATENT DOCUMENTS

| 6,261,675 | B1 * | 7/2001 | Hsiao ..................... B29C 70/22 428/219 |
| 2009/0142980 | A1 * | 6/2009 | Chen .................... D03D 1/0058 442/239 |
| 2015/0266260 | A1 | 9/2015 | Fujioka et al. |

FOREIGN PATENT DOCUMENTS

| EP | 2 295 216 A1 | 3/2011 | |
| EP | 2295216 A1 * | 3/2011 | ......... B29D 99/0089 |

(Continued)

OTHER PUBLICATIONS

Park ("Dynamic compressive response of composite square honeycombs." Composites: Part A 43 (2012) 527-536) (Year: 2012).*

(Continued)

*Primary Examiner* — Tri V Nguyen
(74) *Attorney, Agent, or Firm* — Oblon, McClelland, Maier & Neustadt, L.L.P.

(57) ABSTRACT

A honeycomb core includes carbon fiber having four or more different fiber directions, and when a ribbon direction is set as an X axis direction, a cell width direction is set as a Y axis direction, and a direction that is orthogonal to the ribbon direction and the cell width direction is set as a Z axis direction. A condition in which angles formed by the X axis direction and the respective fiber directions of the carbon fiber are set at −45 degrees, 0 degrees, 45 degrees, and 90 degrees is set as a reference condition. The respective fiber directions are rotated from the reference condition by a fixed rotation angle so that none of the fiber directions are parallel to the X axis direction.

6 Claims, 7 Drawing Sheets

(51) Int. Cl.
*B32B 5/02* (2006.01)
*B64G 1/66* (2006.01)
*G02B 7/183* (2006.01)
*B29C 70/10* (2006.01)

(58) Field of Classification Search
USPC .......................................... 428/116, 117, 119
See application file for complete search history.

(56) References Cited

FOREIGN PATENT DOCUMENTS

| | | | | |
|---|---|---|---|---|
| JP | 3137942 U | | 12/2007 | |
| JP | 2012-1013 A | | 1/2012 | |
| JP | 2012001013 A | * | 1/2012 | ............... B64G 1/66 |
| JP | 2014-37101 A | | 2/2014 | |
| JP | 5578290 B1 | | 8/2014 | |

OTHER PUBLICATIONS

International Search Report dated May 10, 2016 in PCT/JP2016/054711 filed Feb. 18, 2016.
Extended European Search Report dated Jan. 17, 2019 in Patent Application No. 16796138.2, 11 pages.

\* cited by examiner

HONEYCOMB CORE, HONEYCOMB SANDWICH STRUCTURE, AND HONEYCOMB CORE MANUFACTURING METHOD

TECHNICAL FIELD

This invention relates to a honeycomb core, a honeycomb sandwich structure including the honeycomb core, and a method of manufacturing the honeycomb core.

BACKGROUND ART

In recent years, demand for high-definition satellite images of outer space and Earth is increasing in various fields. Accordingly, there is demand for the development of an observation satellite installed with a telescope having a higher resolution than a conventional telescope. To improve the resolution of the telescope in this type of satellite, it is necessary to structure the telescope not only to have a large mirror, but also to be sufficiently rigid to hold the large mirror when launched into space, and to exhibit thermal dimensional stability.

When a temperature distribution occurs over the telescope structure in a space environment and the thermal dimensional stability is low, the telescope structure becomes distorted, leading to a reduction in the definition of the satellite images. It is therefore important to realize a telescope structure exhibiting low thermal expansion.

Here, as an example of the prior art, a honeycomb sandwich structure constituted by a honeycomb core made of carbon fiber reinforced plastic (CFRP) and a pair of CFRP skins that cover respective surfaces and respective sides of the honeycomb core has been proposed (see PTL 1, for example).

In the honeycomb sandwich structure described in PTL 1, the pair of skins are manufactured using skin CFRP in which skin carbon fibers are arranged quasi-isotropically, while the honeycomb core is manufactured using core CFRP in which core carbon fibers are arranged quasi-isotropically. Conventionally, a honeycomb core is manufactured using core CFRP in which core carbon fibers are arranged so as to intersect diagonally relative to a core height direction. In PTL 1, however, the core CFRP is formed such that the core carbon fibers are arranged not only in a parallel direction to the skin surface, but also in an orthogonal direction to the skin surface. With this configuration, a honeycomb sandwich structure that exhibits low thermal expansion and high rigidity even in an out-of-plane direction can be obtained.

CITATION LIST

Patent Literature

[PTL 1] Japanese Patent Application Publication No. 2012-1013

SUMMARY OF INVENTION

Technical Problem

However, the prior art has the following problems.

In the prior art described in PTL 1, which employs a honeycomb core made of CFRP and a skin made of CFRP, one of two fiber directions of the carbon fiber forming the core CFRP is set to be parallel to the skin surface, while the other is set to be orthogonal to the skin surface. In so doing, low thermal expansion and high rigidity can be realized in both an in-plane direction and the out-of-plane direction of the honeycomb sandwich structure.

Here, to manufacture the honeycomb sandwich structure described above, high modulus carbon fiber must be used as the core carbon fiber. However, when a high modulus carbon fiber pre-preg formed by impregnating high modulus carbon fiber with resin is laid onto a honeycomb core-shaped die with a fiber direction of the high modulus carbon fiber pre-preg set to be parallel to a ribbon direction of the honeycomb core, it is difficult to lay the pre-preg onto the die due to the high modulus of elasticity of the fiber. Hence, it is difficult to mold a honeycomb core using high modulus carbon fiber.

Further, a honeycomb core shape can be created from a high modulus carbon fiber pre-preg using a dedicated jig or the like, and a honeycomb core can be molded by applying pressure thereto. However, when a honeycomb core is molded using this method, creasing or tension occurs locally in the high modulus carbon fiber pre-preg, and as a result, characteristics such as a mechanical characteristic and a thermal characteristic of the honeycomb core deteriorate.

This invention has been designed to solve the problems described above, and an object thereof is to obtain a honeycomb core that can be manufactured more easily than a conventional honeycomb core, regardless of the magnitude of a tensile modulus of a carbon fiber pre-preg used as a material thereof, as well as a honeycomb sandwich structure including the honeycomb core and a method of manufacturing the honeycomb core.

Solution to Problem

In a honeycomb core according to this invention, which is configured to include carbon fiber having four or more different fiber directions, when a ribbon direction of the honeycomb core is set as an X axis direction, a cell width direction that is orthogonal to the ribbon direction is set as a Y axis direction, and a direction that is orthogonal to the ribbon direction and the cell width direction is set as a Z axis direction, the respective fiber directions on a honeycomb core plane oriented in a parallel direction to the X axis direction are parallel to an XZ plane constituted by the X axis direction and the Z axis direction, the respective fiber directions are set as a first fiber direction, a second fiber direction, a third fiber direction, and a fourth fiber direction in ascending order of an angle formed by the fiber direction and the X axis direction, and when a condition in which the angle formed by the X axis direction and the first fiber direction is −45 degrees, the angle formed by the X axis direction and the second fiber direction is 0 degrees, the angle formed by the X axis direction and the third fiber direction is 45 degrees, and the angle formed by the X axis direction and the fourth fiber direction is 90 degrees is set as a reference condition, the respective fiber directions are rotated from the reference condition by a fixed rotation angle so that none of the fiber directions are parallel to the X axis direction.

Further, a honeycomb sandwich structure according to this invention includes the honeycomb core, and a pair of skins adhered to the honeycomb core so as to sandwich the honeycomb core.

Furthermore, in a honeycomb core manufacturing method according to this invention, which is a method for manufacturing a honeycomb core configured to include carbon fiber having four or more different fiber directions using pre-preg sheets formed by impregnating the carbon fiber with resin, a first jig and a second jig, each having a plurality of semi-hexagonal column-shaped projections formed parallel to each other, and a plurality of hexagonal column-shaped cores, when a ribbon direction of the honeycomb core is set as an X axis direction, a cell width direction that is orthogonal to the ribbon direction is set as a Y axis direction, and a direction that is orthogonal to the ribbon direction and the cell width direction is set as a Z axis direction, a widthwise direction of the plurality of projections corresponds to the X axis direction and a lengthwise direction of the plurality of projections corresponds to the Z axis direction, the respective fiber directions are set as a first fiber direction, a second fiber direction, a third fiber direction, and a fourth fiber direction in ascending order of an angle formed by the fiber direction and the X axis direction, and when a condition in which the angle formed by the X axis direction and the first fiber direction is −45 degrees, the angle formed by the X axis direction and the second fiber direction is 0 degrees, the angle formed by the X axis direction and the third fiber direction is 45 degrees, and the angle formed by the X axis direction and the fourth fiber direction is 90 degrees is set as a reference condition, the honeycomb core is manufactured by: laminating a plurality of the pre-preg sheets successively onto the first jig in a condition where the respective fiber directions of the carbon fiber included in the pre-preg sheets are rotated from the reference condition by a fixed rotation angle so that none of the fiber directions are parallel to the X axis direction, while interposing the plurality of cores one by one so as to be parallel to the Z axis direction; laminating the second jig thereon; applying heat and pressure; and withdrawing the plurality of cores.

Advantageous Effects of Invention

According to this invention, it is possible to obtain a honeycomb core that can be manufactured more easily than a conventional honeycomb core, regardless of the magnitude of the tensile modulus of the carbon fiber pre-preg used as the material thereof, as well as a honeycomb sandwich structure including the honeycomb core and a method of manufacturing the honeycomb core.

DESCRIPTION OF EMBODIMENTS

Figure 1:
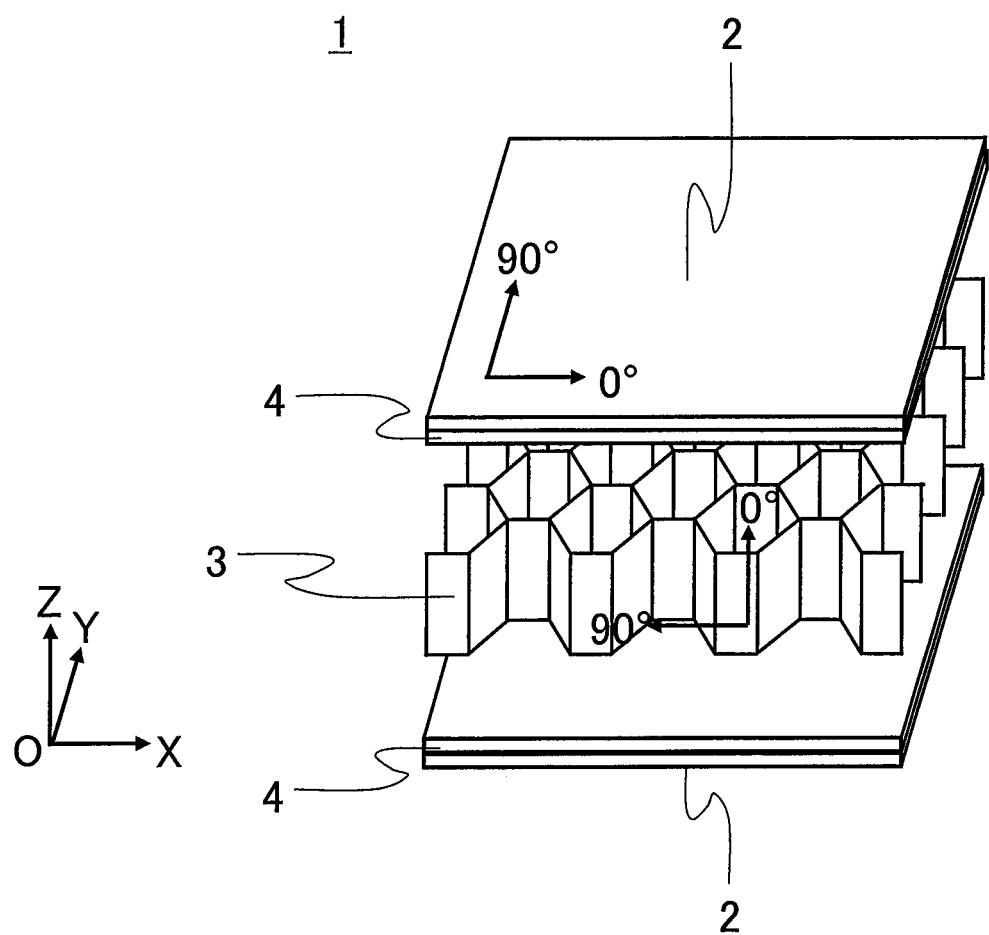
FIG. 1 is an exploded perspective view showing a configuration of a honeycomb sandwich structure according to a first embodiment of this invention.

A preferred embodiment of a honeycomb core, a honeycomb sandwich structure, and a honeycomb core manufacturing method according to this invention will be described below using the figures. Note that in the figures, identical reference numerals have been allocated to identical or corresponding parts, and duplicate description thereof has been omitted. Further, the honeycomb core and honeycomb sandwich structure according to this invention may be applied to the aerospace industry, for example.

First Embodiment

A honeycomb sandwich structure 1 according to a first embodiment is configured to include a honeycomb core 3, and a pair of skins 2 that are adhered to the honeycomb core 3 so as to sandwich the honeycomb core 3. More specifically, the honeycomb sandwich structure 1 is configured as shown in FIG. 1. FIG. 1 is an exploded perspective view showing a configuration of the honeycomb sandwich structure 1 according to the first embodiment of this invention.

In the honeycomb sandwich structure 1 shown in FIG. 1, the pair of skins 2, which are formed using CFRP as a material, are disposed to cover respective height direction end faces of the honeycomb core 3, which is formed using CFRP as a material, via adhesive sheets 4. Further, the pair of skins 2 disposed in this manner are fixed to the honeycomb core 3.

More specifically, the thermosetting adhesive sheets 4 are laid onto respective front surfaces of the pair of skins 2, whereupon the honeycomb core 3 is disposed on the front surface of one of the pair of skins 2, on which the adhesive sheet 4 is laid. Next, the other skin 2, on which the adhesive sheet 4 is laid, is placed on top of the honeycomb core 3, whereupon the adhesive sheets 4 are hardened by applying heat and pressure thereto. As a result, the honeycomb sandwich structure 1 is manufactured.

Here, among in-plane directions of the honeycomb sandwich structure 1, a ribbon direction of the honeycomb core 3 is set as an X axis direction and a cell width direction of the honeycomb core 3 is set as a Y axis direction. Further, an out-of-plane direction of the honeycomb sandwich structure 1 is set as a Z axis direction. Note that the X axis direction and the Y axis direction are orthogonal to each other, and the Z axis direction is orthogonal to the X axis direction and the Y axis direction.

Further, to indicate fiber directions of the carbon fiber included respectively in the skin 2 and the honeycomb core 3, a 0 degrees direction and a 90 degrees direction are set respectively as the X axis direction and the Y axis direction in the skin 2, while a 0 degrees direction and a 90 degrees direction are set respectively as the Z axis direction and the X axis direction in the honeycomb core 3.

Next, an example of a method of manufacturing the skin 2 of the honeycomb sandwich structure 1 will be described. First, for example, a skin pre-preg sheet oriented along two orthogonal axes is manufactured by impregnating an aggregate, which is manufactured by interweaving bundles of height direction-aligned high modulus carbon fibers M60J (manufactured by Toray Industries, Inc.) orthogonally, with cyanate resin EX1515 (manufactured by Koninklijke TenCate Nev.). At this time, the high modulus carbon fibers M603 are bundles of long fibers (filaments) having a diameter between 5 μm and 7 μm.

Next, a laminated body of skin pre-preg sheets, which is formed by successively laminating a plurality of the skin pre-preg sheets manufactured in the manner described above, is hardened by heating the laminated body to a temperature of approximately 120° C. to 180° C. under a pressure of approximately 3 atm. By hardening the laminated body of the skin pre-preg sheets in this manner, the skin 2 is manufactured.

Here, as a method of successively laminating the skin pre-preg sheets, a direction in which a first skin pre-preg sheet is placed is set as a reference direction of 0 degrees, and six skin pre-preg sheets are laminated at 0 degrees, 60 degrees, −60 degrees, −60 degrees, 60 degrees, and 0 degrees, in that order. Note that eight skin pre-preg sheets may be laminated at 0 degrees, 45 degrees, −45 degrees, 90 degrees, 90 degrees, −45 degrees, 45 degrees, and 0 degrees, in that order. The CFRP skin 2 manufactured by hardening the laminated body formed by laminating the skin pre-preg sheets in this manner is quasi-isotropic, or in other words has substantially equal properties in all directions parallel to the skin surface.

Note that when the cyanate resin EX1515 with which the high modulus carbon fiber M60J forming the skin 2 is impregnated functions as an adhesive, the honeycomb sandwich structure 1 may be manufactured without using the adhesive sheets 4 by laminating one of the pair of skins 2, the honeycomb core 3, and the other skin 2 in that order and then applying heat and pressure thereto.

Figure 2:
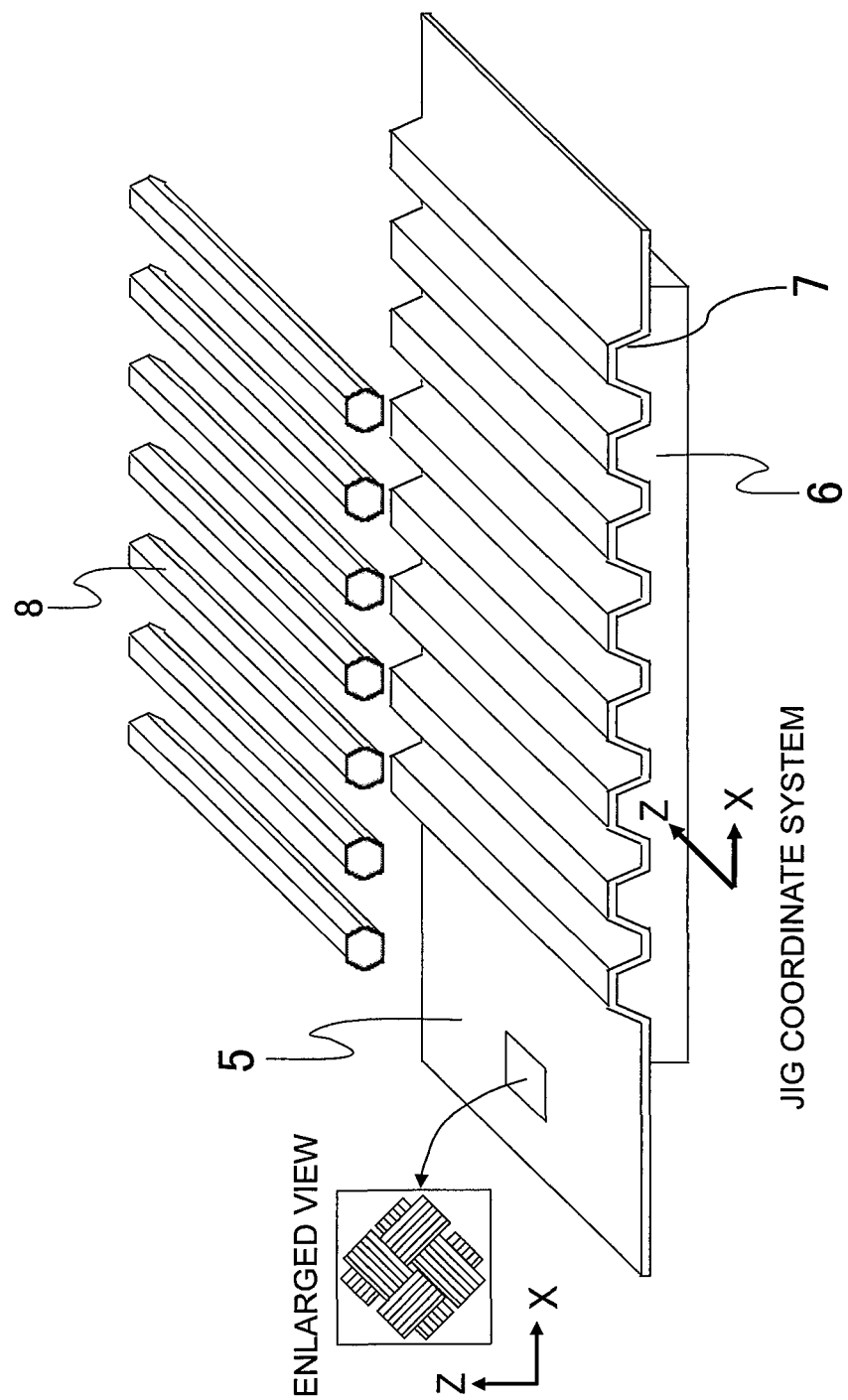
FIG. 2 is a perspective view showing a condition in which a honeycomb core pre-preg sheet serving as a material of a honeycomb core shown in FIG. 1 is laid onto a first jig.
Figure 3:
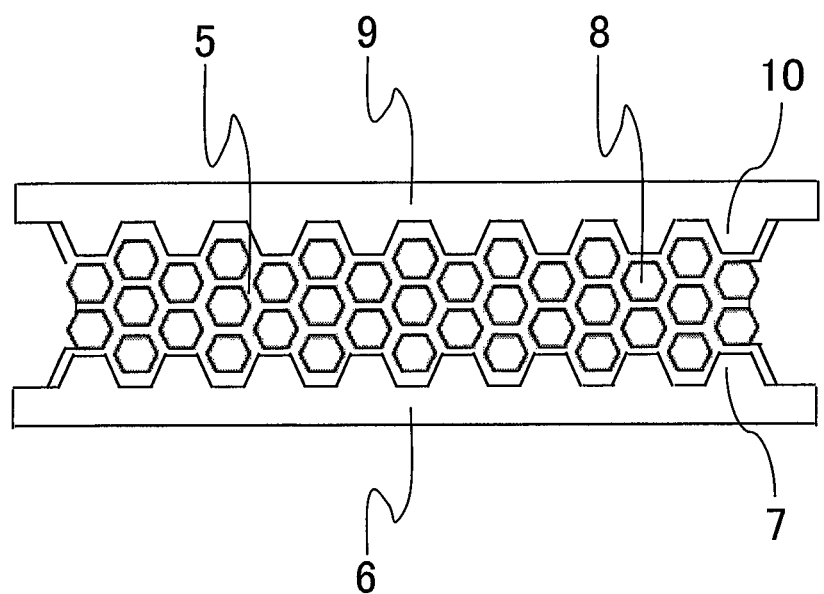
FIG. 3 is a front sectional view showing a condition in which a second jig is laminated onto a laminated body formed by laminating further honeycomb core pre-preg sheets onto the first jig via a plurality of cores from the condition shown in FIG. 2, as seen from a Z axis direction.

Next, an example of a method of manufacturing the honeycomb core 3 of the honeycomb sandwich structure 1 will be described with reference to FIGS. 2 and 3. FIG. 2 is a perspective view showing a condition in which a honeycomb core pre-preg sheet 5 serving as a material of the honeycomb core 3 shown in FIG. 1 is laid onto a first jig 6, and FIG. 3 is a front sectional view showing a condition in which a second jig 9 is laminated onto a laminated body formed by laminating further honeycomb core pre-preg sheets 5 onto the first jig 6 via a plurality of cores 8 from the condition shown in FIG. 2, as seen from the Z axis direction.

Note that FIG. 2 also shows a jig coordinate system in which a widthwise direction of projections 7 formed on the first jig 6 is set as a X axis direction, and a lengthwise direction of the projections 7 is set as a Z axis direction. The X axis direction and the Z axis direction of the jig coordinate system match the X axis direction and the Z axis direction in FIG. 1.

First, for example, the honeycomb core pre-preg sheet 5 (abbreviated to the pre-preg sheet 5 hereafter) is manufactured so as to be oriented along two orthogonal axes by impregnating an aggregate, which is manufactured by interweaving bundles of height direction-aligned high modulus carbon fibers YS80A (manufactured by Nippon Graphite Fiber Co., Ltd.) orthogonally, with cyanate resin NM-31 (manufactured by JXTG Nippon Oil & Energy Corporation). At this time, the high modulus carbon fibers YS80A are bundles of long fibers (filaments) having a diameter between 7 μm and 10 μm.

Next, the pre-preg sheet 5 is molded into the shape of the honeycomb core 3 using the first jig 6, the plurality of cores 8, and the second jig 9. The first jig 6 is a platen having a plurality of the projections 7 arranged parallel to each other and formed in a semi-hexagonal column shape. The plurality of cores 8 each have a hexagonal column shape. The second jig 9, similarly to the first jig 6, includes a plurality of projections 10 arranged parallel to each other and formed in a semi-hexagonal column shape.

More specifically, as shown in FIG. 2, at least two pre-preg sheets 5 are laid onto the first jig 6 in alignment with the shape thereof, whereupon a plurality of the cores 8 are laminated one by one in positions of grooves formed between adjacent pairs of the projections 7. Next, at least two pre-preg sheets 5 are laid onto the first jig 6, on which the plurality of cores 8 are laminated, in alignment with the shape thereof, whereupon a plurality of the cores 8 are laminated one by one in positions of the projections 7. After repeating the process of laminating the pre-preg sheets 5 and the plurality of cores 8 in this manner a plurality of times, the second jig 9, which forms a pair with the first jig 6, is laminated in alignment with the shape of the first jig 6, on which the plurality of cores 8 are laminated, and as a result, the condition shown in FIG. 3 is obtained.

Next, in the condition shown in FIG. 3, the laminated body is hardened by applying heat and pressure thereto, whereupon the plurality of cores 8 are withdrawn. As a result, the honeycomb core 3 is manufactured.

Here, as a method of laying the pre-preg sheet 5 onto the first jig 6, the pre-preg sheet 5 is laid onto the first jig 6 in a condition where respective fiber directions of the carbon fiber included in the pre-preg sheet 5 are rotated from a reference condition, to be described below, by a fixed rotation angle θ, to be described below, so that none of the fiber directions are parallel to the X axis direction. For example, a pre-preg sheet 5 having fiber directions of 0 degrees and (90+θ) degrees is prepared by cutting out a pre-preg sheet having fiber directions set at 0 degrees and 90 degrees in advance. Similarly, a pre-preg sheet 5 having fiber directions of (−45+θ) degrees and (45+θ) degrees is prepared by cutting out a pre-preg sheet having fiber directions set at −45 degrees and 45 degrees in advance. Next, the pre-preg sheets 5 are laid onto the first jig 6 in alignment with the sheet shape.

In other words, a plurality of the pre-preg sheets 5 are laminated successively onto the first jig 6 in a condition where the respective fiber directions of the carbon fiber included in the pre-preg sheets 5 are rotated from the reference condition by the fixed rotation angle θ so that none of the fiber directions are parallel to the X axis direction, while interposing the plurality of cores 8 one by one so as to be parallel to the Z axis direction, whereupon the second jig 9 is laminated thereon. Next, heat and pressure are applied, after which the plurality of cores 8 are withdrawn, and as a result, the honeycomb core 3 is manufactured so as to include carbon fiber having four different fiber directions.

Figure 4:
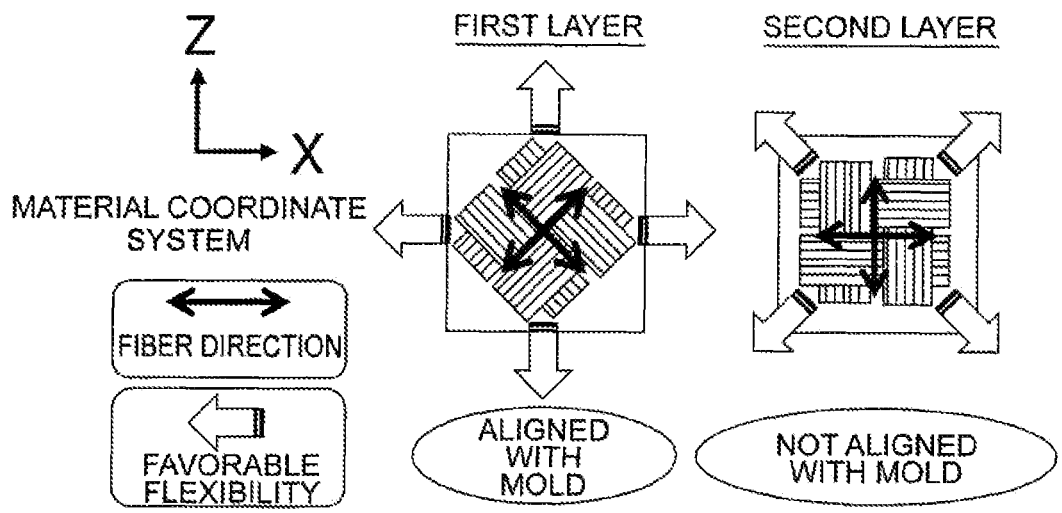
FIG. 4 is an illustrative view showing, as a comparative example, a different laying method to a method of laying the honeycomb core pre-preg sheets onto the first jig according to the first embodiment of this invention.

Effects obtained with this laying method will now be described with reference to FIGS. 4 and 5. FIG. 4 is an illustrative view showing, as a comparative example, a different laying method to the method of laying the pre-preg sheets 5 onto the first jig 6 according to the first embodiment of this invention, and FIG. 5 is an illustrative view showing the method of laying the pre-preg sheets 5 onto the first jig 6 according to the first embodiment of this invention.

Figure 5:
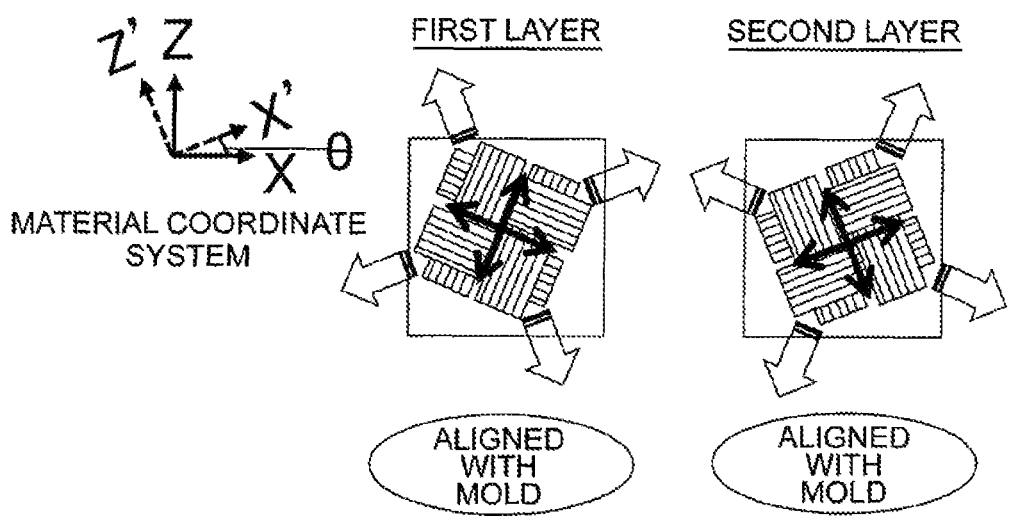
FIG. 5 is an illustrative view showing the method of laying the honeycomb core pre-preg sheets onto the first jig according to the first embodiment of this invention.

Note that FIGS. 4 and 5 also show a material coordinate system in which, of the fiber directions of the carbon fiber, a 0 degrees direction is set as a Z axis direction and a 90 degrees direction is set as an X axis direction. The X axis direction and the Z axis direction of the material coordinate system match the X axis direction and the Z axis direction of FIG. 1.

The comparative example shown in FIG. 4 corresponds to the prior art described in PTL 1, wherein the honeycomb core 3 is configured to include carbon fiber in which one of four different fiber directions arranged at a 45-degree pitch so as to be parallel to an XZ plane is parallel to the X axis. With this configuration, the carbon fibers of the honeycomb core 3 are arranged quasi-isotropically.

To manufacture the honeycomb core 3 with this configuration, the first pre-preg sheet 5 must be laid onto the first jig 6 such that angles formed by the respective fiber directions of the carbon fiber included in the pre-preg sheet 5 and the X axis direction are set at 45 degrees and −45 degrees. Further, the second pre-preg sheet 5 must be laid onto the first pre-preg sheet 5 such that the angles formed by the respective fiber directions of the carbon fiber and the X axis direction are set at 0 degrees and 90 degrees.

Here, focusing on the first and second pre-preg sheets 5, the following finding was obtained. It was found that since the first pre-preg sheet 5 exhibits favorable flexibility in the X axis direction (indicated by outlined arrows in the figure), the first pre-preg sheet 5 can be laid onto the first jig 6 in alignment with a mold of the first jig 6, but since the second pre-preg sheet 5 is not very flexible in the X axis direction, the second pre-preg sheet 5 cannot easily be aligned with the mold of the first jig 6. In this case, it is difficult to mold the honeycomb core 3. Further, when the second pre-preg sheet 5 was laid onto the first jig 6 by exerting a large load thereon using a dedicated jig, the carbon fibers in the second pre-preg sheet 5 broke. In this case, although the honeycomb core 3 can be molded, characteristics thereof such as a mechanical characteristic and a thermal characteristic deteriorate.

In this invention, however, the honeycomb core 3 is manufactured to include carbon fiber oriented such that the four fiber directions thereof on a honeycomb core plane oriented in a parallel direction to the X axis direction are respectively parallel to the XZ plane and not parallel to the X axis direction. By forming the honeycomb core 3 in this manner, none of the angles formed by the fiber directions of the carbon fiber included in the pre-preg sheets 5 and the X axis direction are 0 degrees, and therefore the pre-preg sheets 5 can be aligned with the mold of the first jig 6 when laid onto the first jig 6. As a result, the honeycomb core 3 can be manufactured easily. Moreover, in contrast to the example described above, the carbon fibers in both the first and the second pre-preg sheets 5 do not break, and therefore characteristics such as the mechanical characteristic and the thermal characteristic do not deteriorate.

In the honeycomb core 3 manufactured to include carbon fiber having four different fiber directions, as described above, the respective fiber directions on the honeycomb core plane oriented in a parallel direction to the X axis direction are rotated from the reference condition by the fixed rotation angle θ so that none of the fiber directions are parallel to the X axis direction. In so doing, the pre-preg sheets 5 can be aligned with the mold of the first jig 6 when laid onto the first jig 6, and as a result, the honeycomb core 3 can be molded easily.

Note that FIGS. 4 and 5 show a case in which, when the respective fiber directions of the carbon fiber included in the honeycomb core 3 are set as a first fiber direction, a second fiber direction, a third fiber direction, and a fourth fiber direction in ascending order of the angle formed by the fiber direction and the X axis direction, an angle formed by the first fiber direction and the third fiber direction and an angle formed by the second fiber direction and the fourth fiber direction are both 90 degrees. Further, a condition in which the angle formed by the X axis direction and the first fiber direction is −45 degrees, the angle formed by the X axis direction and the second fiber direction is 0 degrees, the angle formed by the X axis direction and the third fiber direction is 45 degrees, and the angle formed by the X axis direction and the fourth fiber direction is 90 degrees, as shown in FIG. 4, will be referred to as the reference condition.

Furthermore, FIGS. 4 and 5 show a case in which the honeycomb core 3 is configured to include an aggregate manufactured by interweaving first carbon fiber bundles such that the first fiber direction and the third fiber direction are orthogonal to each other, and an aggregate manufactured by interweaving second carbon fiber bundles such that the second fiber direction and the fourth fiber direction are orthogonal to each other.

Here, as shown in FIG. 5 in particular, the first and second pre-preg sheets 5 are laid onto the first jig 6 such that the fiber directions of the carbon fiber shown in FIG. 4 are rotated by the rotation angle θ relative to the X axis direction. In other words, the angles formed by the respective fiber directions of the carbon fiber included in the first pre-preg sheet 5 and the X axis direction are (45+θ) degrees and (−45+θ) degrees, while the angles formed by the respective fiber directions of the carbon fiber included in the second pre-preg sheet 5 and the X axis direction are 0 degrees and (90+θ) degrees. Hence, the respective fiber directions are rotated by the fixed rotation angle θ from the reference condition so that none of the fiber directions are parallel to the X axis direction.

In this case, not only are none of the different fiber directions of the carbon fiber parallel to the X axis direction, but also, the respective fiber directions of the first layer of carbon fiber are orthogonal to each other and the respective fiber directions of the second layer of carbon fiber are orthogonal to each other. According to this configuration, the pre-preg sheets 5 can be aligned with the mold of the first jig 6 when laid onto the first jig 6 such that the honeycomb core 3 can be molded easily, and the honeycomb core 3 can be manufactured such that the carbon fibers are arranged quasi-isotropically.

Figure 10:
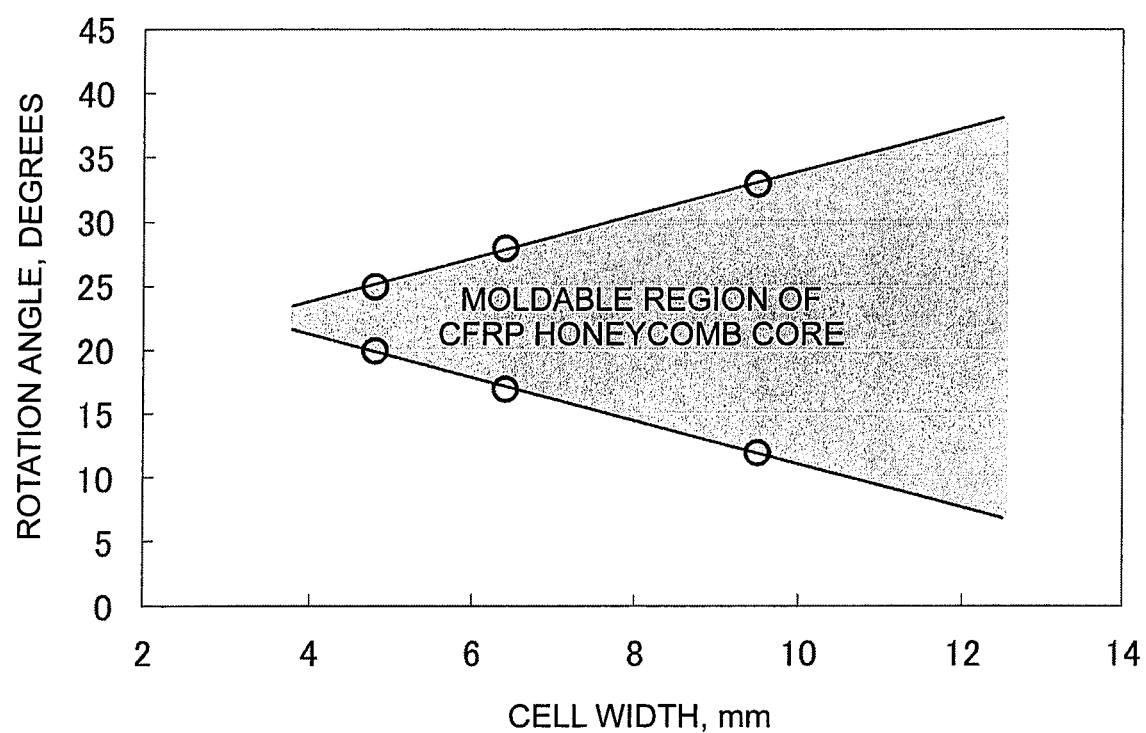
FIG. 10 is a graph showing a relationship between the rotation angle θ and a cell width size at which the honeycomb core according to the first embodiment of this invention can be molded.

Note that it was found, as a result of committed research, that the range of the rotation angle θ at which the pre-preg sheets 5 can be laid onto the first jig 6 varies according to a cell width size of the honeycomb core 3. As a specific example, it was confirmed that when the carbon fiber included in the pre-preg sheet 5 is high modulus carbon fiber having a tensile modulus of at least 500 GPa, and the cell width size of the honeycomb core 3 is 9.5 mm, the rotation angle θ is within a range of no less than 12 degrees and no more than 33 degrees, and when the cell width size of the honeycomb core 3 is 6.4 mm, the rotation angle θ is within a range of no less than 17 degrees and no more than 28 degrees. Further, it was confirmed that when the cell width size of the honeycomb core 3 is 4.8 mm, the rotation angle θ is within a range of no less than 20 degrees and no more than 25 degrees. FIG. 10 is a graph showing a relationship between the rotation angle θ and the cell width size at which the honeycomb core 3 according to the first embodiment of this invention can be molded. FIG. 10 shows the above results, or more specifically shows a region in which the CFRP honeycomb core 3 can be molded by plotting the rotation angle θ and the cell width size at which the honeycomb core 3 can be molded. Note that in the figure, this region is denoted as a moldable region of the CFRP honeycomb core.

Next, a relationship between the rotation angle θ employed when manufacturing the honeycomb core 3 and out-of-plane direction characteristics of the honeycomb sandwich structure 1 including the honeycomb core 3 will be described with reference to FIGS. 6 and 7.

Figure 6:
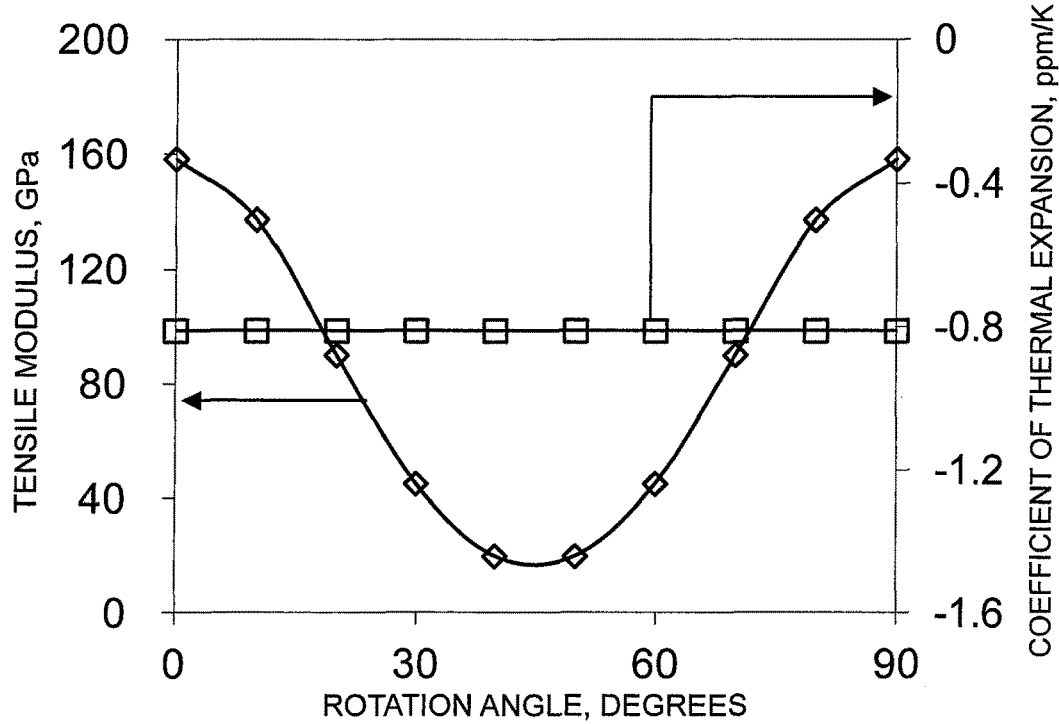
FIG. 6 is a graph showing a relationship between out-of-plane direction characteristics of the honeycomb sandwich structure and a rotation angle θ employed when the honeycomb core is manufactured by rotating only a second honeycomb core pre-preg sheet by the rotation angle θ from the condition shown in FIG. 4.
Figure 7:
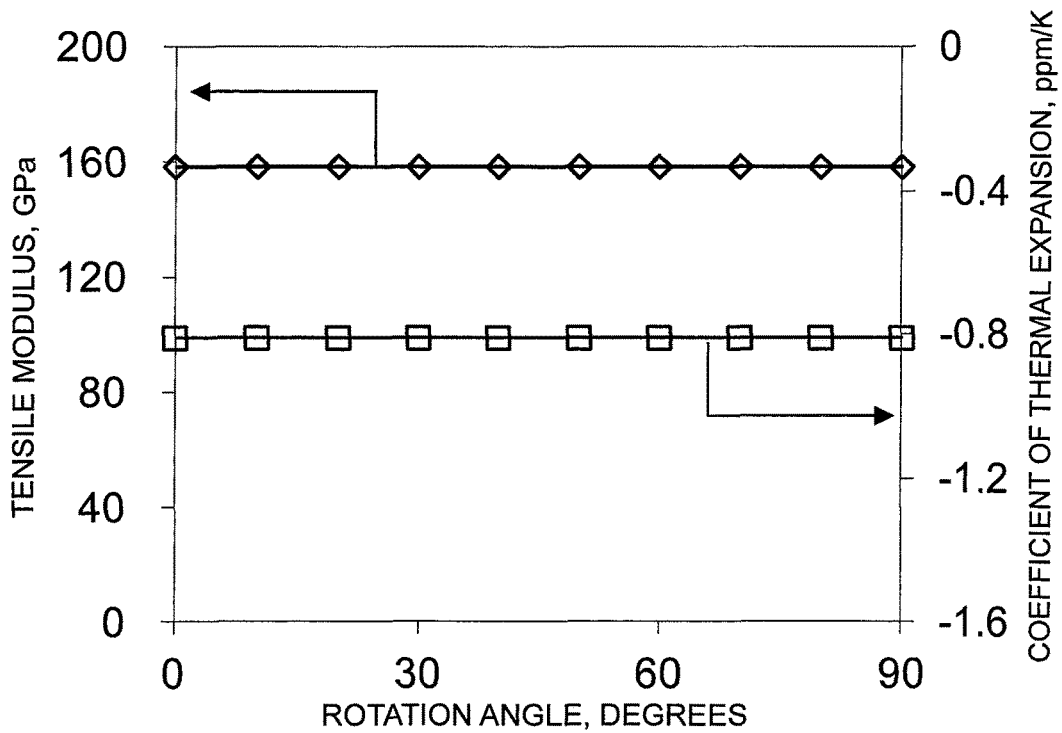
FIG. 7 is a graph showing a relationship between the out-of-plane direction characteristics of the honeycomb sandwich structure and the rotation angle θ employed when the honeycomb core is manufactured by rotating both first and second honeycomb core pre-preg sheets by the rotation angle θ from the condition shown in FIG. 4.

FIG. 6 is a graph showing the relationship between the out-of-plane direction characteristics of the honeycomb sandwich structure 1 and the rotation angle θ employed when the honeycomb core 3 is manufactured by rotating only the second pre-preg sheet 5 by the rotation angle θ from the condition shown in FIG. 4. FIG. 7 is a graph showing the relationship between the out-of-plane direction characteristics of the honeycomb sandwich structure 1 and the rotation angle θ employed when the honeycomb core 3 is manufactured by rotating both the first and the second pre-preg sheets 5 by the rotation angle θ from the condition shown in FIG. 4. Note that FIGS. 6 and 7 respectively show variation in the tensile modulus and the coefficient of thermal expansion as variation in the out-of-plane direction characteristics of the honeycomb sandwich structure 1.

Here, a case in which the honeycomb core 3 is manufactured by rotating only the second pre-preg sheet 5, which is difficult to lay onto the first jig 6, or in other words only the pre-preg sheet 5 in which the angles formed by the fiber directions of the carbon fiber and the X axis direction are 0 degrees and 90 degrees, by the rotation angle θ will be considered. In this case, the pre-preg sheet 5 can be aligned with the mold of the first jig 6 when laid onto the first jig 6, and as a result, the honeycomb core 3 can be molded easily. As shown in FIG. 6, however, the tensile modulus in the out-of-plane direction of the honeycomb sandwich structure 1 decreases in accordance with the magnitude of the rotation angle θ.

Therefore, to suppress a reduction in the out-of-plane direction tensile modulus of the honeycomb sandwich structure 1, the honeycomb core 3 is manufactured by rotating both the first and the second pre-preg sheets 5 by the rotation angle θ. Likewise in this case, the pre-preg sheets 5 can be aligned with the mold of the first jig 6 when laid onto the first jig 6, and as a result, the honeycomb core 3 can be molded easily. Moreover, the honeycomb core 3 is manufactured such that the carbon fibers are arranged quasi-isotropically, and therefore, as shown in FIG. 7, the out-of-plane direction tensile modulus of the honeycomb sandwich structure 1 remains constant, without decreasing in accordance with the magnitude of the rotation angle θ.

Hence, in the honeycomb core 3, the fiber directions of the carbon fiber are respectively rotated from the reference condition by the fixed rotation angle θ so that none of the fiber directions on the honeycomb core plane oriented in a parallel direction to the X axis direction are parallel to the X axis direction. As a result, the honeycomb core 3 can be molded easily, and the honeycomb core 3 can be manufactured such that the carbon fibers are arranged quasi-isotropically.

Figure 8:
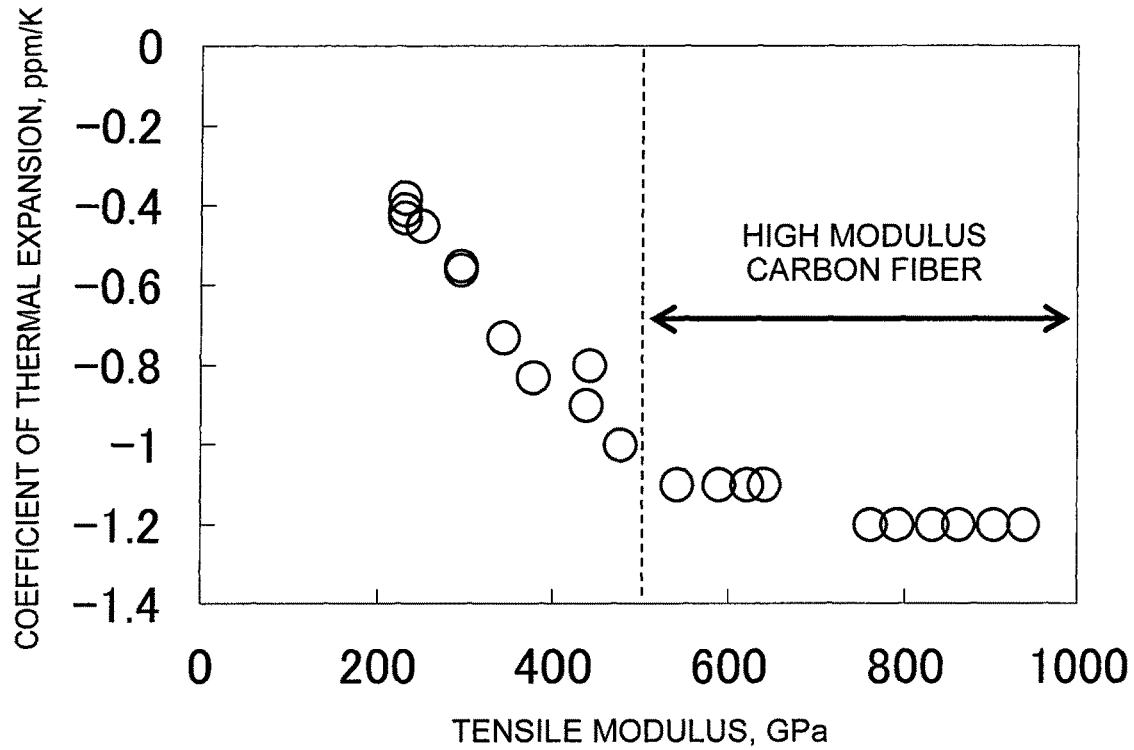
FIG. 8 is a graph showing a relationship between a tensile modulus and a coefficient of thermal expansion of carbon fiber used to manufacture the honeycomb core according to the first embodiment of this invention.

Next, the carbon fiber included in the honeycomb core 3 will be described with reference to FIG. 8. FIG. 8 is a graph showing a relationship between the tensile modulus and the coefficient of thermal expansion of the carbon fiber used to manufacture the honeycomb core 3 according to the first embodiment of this invention. As shown in FIG. 8, a feature of the carbon fiber is that the coefficient of thermal expansion increases steadily in a negative direction as the tensile modulus increases.

Here, the out-of-plane direction coefficient of thermal expansion of the honeycomb sandwich structure 1 is a value determined by dividing the sum of: a product of an out-of-plane direction coefficient of thermal expansion and a plate thickness of the two skins 2; a product of an out-of-plane direction coefficient of thermal expansion and a plate thickness of the two adhesive sheets 4; and a product of an out-of-plane direction coefficient of thermal expansion and a height of the honeycomb core 3, by a height of the honeycomb sandwich structure 1.

At this time, the carbon fiber, which has a negative coefficient of thermal expansion, and the resin, which has a positive coefficient of thermal expansion, cancel each other out, as noted above, and therefore an in-plane direction coefficient of thermal expansion of the skins 2 takes a value close to zero. Meanwhile, since the carbon fibers are not arranged consecutively, thermal expansion of the resin is dominant, and therefore the out-of-plane direction coefficient of thermal expansion of the skins 2 is a positive coefficient of thermal expansion. Moreover, the in-plane and out-of-plane coefficients of thermal expansion of the adhesive sheets 4 are also positive coefficients of thermal expansion.

Hence, the respective out-of-plane coefficients of thermal expansion of the two skins 2 and the two adhesive sheets 4 take positive values within a range of approximately 20 ppm/° C. to 70 ppm/° C., for example. Accordingly, to bring the out-of-plane direction coefficient of thermal expansion of the honeycomb sandwich structure 1 close to zero, the out-of-plane direction coefficient of thermal expansion of the honeycomb core 3 must be set at the largest possible negative value.

According to this invention, therefore, the honeycomb core 3 is manufactured using high modulus carbon fiber, or in other words carbon fiber having a large negative coefficient of thermal expansion, and the honeycomb sandwich structure 1 is manufactured using this honeycomb core 3. As a result, the honeycomb sandwich structure 1 can be realized so as to exhibit high rigidity and low thermal expansion in the out-of-plane direction.

Further, an in-plane direction coefficient of thermal expansion of the honeycomb sandwich structure 1 takes a value determined by the relationships between the tensile moduli of elasticity and the in-plane direction coefficients of thermal expansion of the two skins 2, the two adhesive sheets 4, and the honeycomb core 3, and by adjusting the out-of-plane direction coefficients of thermal expansion, the honeycomb sandwich structure 1 can be realized so as to exhibit high rigidity and low thermal expansion in both the in-plane direction and the out-of-plane direction.

Figure 9:
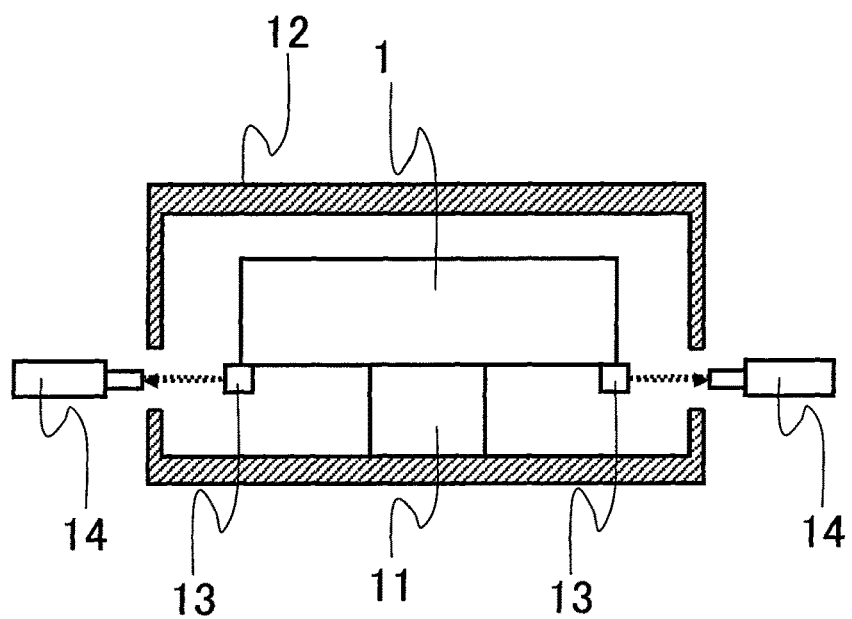
FIG. 9 is a sectional view showing a configuration of a measurement system for measuring an out-of-plane direction coefficient of thermal expansion of the honeycomb sandwich structure according to the first embodiment of this invention.

Next, examples of measurement results of the out-of-plane direction coefficient of thermal expansion of the honeycomb sandwich structure 1 will be described with reference to FIG. 9. FIG. 9 is a sectional view showing a configuration of a measurement system for measuring the out-of-plane direction coefficient of thermal expansion of the honeycomb sandwich structure 1 according to the first embodiment of this invention.

As shown in FIG. 9, the honeycomb sandwich structure 1 is placed on a sample support base 11 with laser reflectors 13 adhered fixedly to the pair of skins 2, and then disposed in a thermostat bath 12. A temperature of the honeycomb sandwich structure 1 can be varied by controlling a temperature in the thermostat bath 12. Further, the coefficient of thermal expansion is calculated by emitting laser light from a laser focus displacement meter 14, receiving reflection light from the laser reflectors 13, and measuring an amount of displacement occurring in the honeycomb sandwich structure 1 when heated.

Note that in the honeycomb sandwich structure 1 serving as the measurement subject of the measurement system shown in FIG. 9, the thickness of the skin 2 is 0.72 mm, and the thickness of the adhesive sheet 4 is 0.06 mm.

Further, the honeycomb core 3 of the measurement subject honeycomb sandwich structure 1 is manufactured by rotating both the first and the second pre-preg sheets 5 by the rotation angle θ, which is set at 22.5 degrees, on the material coordinate system shown in FIG. 5. More specifically, the honeycomb core 3 is manufactured by laying the respective pre-preg sheets 5 onto the first jig 6 such that the angles formed by the respective fiber directions of the carbon fiber included in the first pre-preg sheet 5 and the X axis direction are (45+22.5) degrees and (−45+22.5) degrees, and the angles formed by the respective fiber directions of the carbon fiber included in the second pre-preg sheet 5 and the X axis direction are (0+22.5) degrees and (90+22.5) degrees. Moreover, the cell size and the height of the honeycomb core 3 are set at ¼ inches and 122.0 mm, respectively.

The out-of-plane direction coefficient of thermal expansion of the honeycomb sandwich structure 1, when measured using the measurement system shown in FIG. 9, was 0.08 ppm/° C.

Further, in the honeycomb sandwich structure 1, the out-of-plane coefficient of thermal expansion remained at 0.08 ppm/° C. even when the cell size of the honeycomb core 3 was varied from ¼ inches to ⅜ inches. Note that normally, the cell size of the honeycomb core 3 is often set at either ¼ inches or ⅜ inches, but a substantially identical coefficient of thermal expansion can be expected even at intermediate sizes therebetween.

Hence, in the honeycomb core 3 of the honeycomb sandwich structure 1, creasing and tension do not occur locally even when the honeycomb core 3 is molded using pre-preg sheets including high modulus carbon fiber. As a result, the rigidity of the honeycomb sandwich structure 1 can be improved, and the coefficient of thermal expansion can be set at substantially zero. Therefore, with the honeycomb core 3 according to this invention, the honeycomb sandwich structure 1 can be realized so as to exhibit high rigidity and low thermal expansion in the out-of-plane direction.

Note that in the first embodiment, a case in which high modulus carbon fiber YS80A having a tensile modulus of approximately 785 GPa is used as the carbon fiber included in the honeycomb core 3 was described as an example, but this invention is not limited thereto, and may be applied regardless of the magnitude of the tensile modulus of the carbon fiber included in the honeycomb core 3.

More specifically, as shown in FIG. 8, the coefficient of thermal expansion of high modulus carbon fiber having a tensile modulus of 500 GPa or more remains substantially constant. Therefore, as long as high modulus carbon fiber having a tensile modulus of at least 500 GPa is used as the material of the honeycomb core 3, the out-of-plane direction coefficient of thermal expansion of the honeycomb sandwich structure 1 can be set at substantially zero. Accordingly, carbon fiber having a tensile modulus of at least 500 GPa is preferably used as the carbon fiber included in the honeycomb core 3.

Note that in the first embodiment, a case in which the honeycomb core 3 is configured to include carbon fiber having four different fiber directions was described as an example, but this invention is not limited thereto, and the honeycomb core 3 may be configured to include carbon fiber having four or more different fiber directions. In FIG. 5, for example, by laying a third pre-preg sheet 5 so as not to match the fiber directions of the carbon fiber included in the first and second pre-preg sheets 5, the honeycomb core 3 can be configured to include carbon fiber having six different fiber directions. Likewise when the honeycomb core 3 is configured to include carbon fiber having four or more fiber directions, the four or more fiber directions on the honeycomb core plane oriented in a parallel direction to the X axis direction are rotated from the reference condition by the fixed rotation angle θ so as to be parallel to the XZ plane but not parallel to the X axis direction.

Note that in the first embodiment, a case in which the biaxially oriented pre-preg sheets 5 including aggregates manufactured by interweaving bundles of carbon fiber orthogonally are employed was described as an example, but this invention is not limited to the pre-preg sheets 5 including aggregates manufactured by interweaving bundles of carbon fiber orthogonally, and as long as the pre-preg sheets are biaxially oriented, any pre-preg sheets may be used. Moreover, in the biaxially oriented pre-preg sheets, the respective fiber directions do not have to be orthogonal to each other.

Note that in the first embodiment, a case in which the honeycomb core 3 is formed using the biaxially oriented pre-preg sheets 5 so as to include carbon fiber having four different fiber directions was described as an example, but this invention is not limited thereto, and the honeycomb core 3 may be formed using uniaxially oriented pre-preg sheets so as to include carbon fiber having four different fiber directions. In this case, in contrast to FIG. 5, the carbon fiber included in the honeycomb core 3 is oriented in four different fiber directions by employing four uniaxially oriented pre-preg sheets.

Note that in the first embodiment, a case in which the pair of skins 2 are formed by laminating skin pre-preg sheets such that the fiber direction of the carbon fiber is symmetrical to the Z axis direction was described as an example, but the pair of skins 2 may be formed by laminating skin pre-preg sheets such that the fiber direction of the carbon fiber is symmetrical to the Z axis direction about the honeycomb core 3.

According to the first embodiment, as described above, in a honeycomb core configured to include carbon fiber having four or more different fiber directions, when a condition in which the angles formed respectively by the X axis direction and the fiber directions of the carbon fiber are −45 degrees, 0 degrees, 45 degrees, and 90 degrees is set as the reference condition, the respective fiber directions are rotated from the reference condition by the fixed rotation angle so that none of the fiber directions are parallel to the X axis direction.

The honeycomb core having this configuration is easier to manufacture than a conventional honeycomb core, regardless of the magnitude of the tensile modulus of the carbon fiber pre-preg used as the material thereof. Moreover, creasing and tension do not occur when the pre-preg sheet is laid onto the first jig, or in other words the honeycomb core-shaped die, and therefore the pre-preg sheet can be laid onto the die easily. As a result, the honeycomb core can be molded easily.

The invention claimed is:

1. A honeycomb core comprising:
carbon fibers having four or more different fiber directions,
wherein, when a ribbon direction of the honeycomb core is set as an X axis direction, a cell width direction that is orthogonal to the ribbon direction is set as a Y axis direction, and a direction that is orthogonal to the ribbon direction and the cell width direction is set as a Z axis direction,
respective fiber directions of the carbon fibers on a honeycomb core plane oriented in a parallel direction to the X axis direction are parallel to an XZ plane constituted by the X axis direction and the Z axis direction,
the respective fiber directions are set as a first fiber direction, a second fiber direction, a third fiber direction, and a fourth fiber direction in ascending order of an angle formed by the fiber direction and the X axis direction, and
when a condition in which the angle formed by the X axis direction and the first fiber direction is −45 degrees, the angle formed by the X axis direction and the second fiber direction is 0 degrees, the angle formed by the X axis direction and the third fiber direction is 45 degrees, and the angle formed by the X axis direction and the fourth fiber direction is 90 degrees is set as a reference condition; and
the honeycomb core includes:
a first layer is a first aggregate manufactured by interweaving a first bundle of the carbon fibers oriented in the first fiber direction and a third bundle of the carbon fibers oriented in the third fiber direction so that they are orthogonal to each other, and
a second layer is a second aggregate manufactured by interweaving a second bundle of the carbon fibers oriented in the second fiber direction and a fourth bundle of the carbon fibers oriented in the fourth fiber direction so that they are orthogonal to each other,
wherein the second layer is laid on top of the first layer, and
wherein respective fiber directions are rotated from the reference condition by a fixed rotation angle so that none of the fiber directions of the carbon fibers in the first and second aggregates are parallel to the X axis direction.

2. The honeycomb core according to claim 1, wherein the rotation angle is within a range of no less than 12 degrees and no more than 33 degrees.

3. The honeycomb core according to claim 1, wherein a tensile modulus of at least one of the carbon fibers is at least 500 GPa.

4. A honeycomb core according to claim 1, wherein the respective fiber directions are rotated from the reference condition by a fixed rotation angle determined according to a cell width size of the honeycomb core so that none of the fiber directions of the carbon fibers in the first and second aggregates are parallel to the X axis direction.

5. A honeycomb sandwich structure comprising:
the honeycomb core according to claim 1; and
a pair of skins adhered to the honeycomb core so as to sandwich the honeycomb core.

6. A honeycomb core manufacturing method for manufacturing a honeycomb core including carbon fibers having four or more different fiber directions, comprising:
using:
pre-preg sheets formed by impregnating the carbon fibers with resin;
a first jig and a second jig, each having a plurality of semi-hexagonal column-shaped projections formed parallel to each other; and
a plurality of hexagonal column-shaped cores,
wherein, when a ribbon direction of the honeycomb core is set as an X axis direction, a cell width direction that is orthogonal to the ribbon direction is set as a Y axis direction, and a direction that is orthogonal to the ribbon direction and the cell width direction is set as a Z axis direction,
a widthwise direction of the plurality of projections corresponds to the X axis direction and a lengthwise direction of the plurality of projections corresponds to the Z axis direction,
respective fiber directions of the carbon fibers are set as a first fiber direction, a second fiber direction, a third fiber direction, and a fourth fiber direction in ascending order of an angle formed by the fiber direction and the X axis direction, and
when a condition in which the angle formed by the X axis direction and the first fiber direction is −45 degrees, the angle formed by the X axis direction and the second fiber direction is 0 degrees, the angle formed by the X axis direction and the third fiber direction is 45 degrees, and the angle formed by the X axis direction and the fourth fiber direction is 90 degrees is set as a reference condition; and
the honeycomb core is manufactured by:
laminating a plurality of the pre-preg sheets successively onto the first jig in a condition where the respective fiber directions of the carbon fibers included in the pre-preg sheets are rotated from the reference condition by a fixed rotation angle so that none of the fiber directions are parallel to the X axis direction, while interposing the plurality of hexagonal column-shaped cores one by one so as to be parallel to the Z axis direction;
laminating the second jig thereon;
applying heat and pressure; and
withdrawing the plurality of hexagonal column-shaped cores.

* * * * *